United States Patent [19]
Iizuka et al.

[11] Patent Number: 5,108,638
[45] Date of Patent: Apr. 28, 1992

[54] ABSORBENT SOLUTION FOR USE WITH ABSORPTION REFRIGERATION APPARATUS

[75] Inventors: Hiroshi Iizuka; Kotoku Nagamatsuya; Kenji Takahashi; Jun Kuroda, all of Shizuoka, Japan

[73] Assignee: Yazaki Corporation, Tokyo, Japan

[21] Appl. No.: 607,761

[22] Filed: Oct. 30, 1990

Related U.S. Application Data

[63] Continuation of Ser. No. 208,079, Jun. 17, 1988, abandoned.

[30] Foreign Application Priority Data

| Jun. 26, 1987 | [JP] | Japan | 62-158871 |
| Jun. 26, 1987 | [JP] | Japan | 62-158872 |
| Jun. 26, 1987 | [JP] | Japan | 62-158873 |
| Jun. 26, 1987 | [JP] | Japan | 62-158874 |

[51] Int. Cl.$^5$ .................................. C09K 5/00
[52] U.S. Cl. ..................... 252/69; 62/112; 62/476; 252/67
[58] Field of Search ............... 252/69, 68, 67; 62/112, 62/102, 476, 122, 114

[56] References Cited

U.S. PATENT DOCUMENTS

| 3,296,814 | 1/1967 | Lynch et al. | 62/112 |
| 3,478,530 | 11/1969 | Aronson | 62/112 |
| 3,524,815 | 8/1970 | Hensel, Jr. et al. | 62/112 X |
| 3,541,013 | 11/1970 | Macriss et al. | 62/112 |
| 3,626,708 | 12/1971 | Lyon | 62/112 |
| 3,643,455 | 2/1972 | Hensel, Jr. et al. | 62/112 |
| 4,311,024 | 1/1982 | Itoh et al. | 62/112 X |
| 4,454,724 | 6/1984 | Erickson | 62/112 |

OTHER PUBLICATIONS

Hainsworth, "Refrigerants & Absorbents", Refrigerating Engineering, vol. 48, Sep. 1944, pp. 19 & 20.

*Primary Examiner*—Albert J. Makay
*Assistant Examiner*—John Sollecito
*Attorney, Agent, or Firm*—Venable, Baetjer and Howard

[57] ABSTRACT

An absorbent solution for an absorption refrigeration apparatus is composed of water as a refrigerant and an absorbent. The absorbent is a mixture of at least three lithium compounds selected from the group consisting of lithium bromide, lithium iodide, lithium chloride, and lithium nitrate. The mixture ratio of, for example, lithium bromide to lithium iodide to lithium chloride in the absorbent is 1:0.1–1.0:0.05–0.50. Therefore, since absorption temperature sufficiently higher than crystallization temperature can be achieved, neither lithium halide nor lithium nitrate is precipitated in the absorbent solution during the operation cycle of the refrigeration apparatus.

13 Claims, 11 Drawing Sheets

Fig.1b

DÜHRING DIAGRAM OF SOLUTIONS OF LiBr-LiI-LiNO₃

Fig.1c

DÜHRING DIAGRAM OF SOLUTIONS OF LiBr-LiCl-LiNO₃

Fig. 1d

DÜHRING DIAGRAM OF SOLUTIONS OF LiBr-LiI-LiCl-LiNO₃

Fig.2b
Prior Art
DÜHRING DIAGRAM OF SOLUTIONS OF LiBr

Fig.3

SOLUBILITY OF LITHIUM BROMIDE IN WATER

ABSORBENT SOLUTION FOR USE WITH ABSORPTION REFRIGERATION APPARATUS

This application is a continuation of application Ser. No. 208,079, filed Jun. 17, 1988, now abandoned.

BACKGROUND OF THE INVENTION

1. Field of the invention

The present invention relates generally to absorbent solutions for use with absorption refrigeration apparatus and, more particularly, to absorbent solutions which include water as refrigerant and which do not undergo crystallization even at low temperatures.

2. Description of the Related Art

Typical absorbent solutions for use with absorption refrigeration apparatus include a refrigerant and an absorbent dissolved therein. The principal operation cycle of such an absorption refrigeration apparatus comprises the steps of: heating an absorbent solution whose refrigerant contains the absorbent at a low concentration (hereinafter referred to as a "low-concentration absorbent solution") to evaporate part of the refrigerant, thereby forming an absorbent solution whose refrigerant contains the absorbent at a high concentration (hereinafter referred to as a "high-concentration absorbent solution"); condensing the evaporated refrigerant to form a liquid refrigerant; re-evaporating the liquid refrigerant to remove the latent heat due to the evaporation to the exterior thereby effecting cooling; causing the high-concentration absorbent solution to absorb the re-evaporated refrigerant to form a low-concentration absorbent solution; and removing the resultant absorption heat to the exterior The concentration of the low-concentration absorbent solution is determined depending upon the re-evaporation temperature of the refrigerant and conditions under which the absorption heat is removed. The concentration of the high-concentration absorbent solution is determined on condition that the absorbent does not undergo crystallization during the cycle of operation.

Heretofore, typical absorbent solutions include water as a refrigerant and lithium bromide as an absorbent. Such a conventional type of lithium bromide-water absorbent solution has involved the following problems The crystallization temperature of lithium bromide is so low that the concentration of the high-concentration absorbent solution is limited to a low level, and it is impossible to assure a sufficiently large concentration difference between the low-concentration absorbent solution and the high-concentration absorbent solution which difference is determined on the basis of cooling conditions such as the re-evaporation temperature of the refrigerant and the temperature of the absorption heat. This makes it necessary to increase the quantity of absorbent solution to be circulated, with the result that a result coefficient (a quantity $Q_E$ of heat absorbed in an evaporator/a quantity $Q_G$ of heat generated in a generator) is lowered and therefore cooling efficiency is limited. Even if the concentration of the absorbent is maintained at a level at which no crystallization takes plate in the range of operating temperatures, the risk of crystallization will become great when the temperature of the absorbent solution falls to ambient air temperature after the stoppage of the refrigeration apparatus. Accordingly, it has been dangerous to operate the refrigeration cycle under such a condition.

As will be evident from the foregoing, if the lithium bromide-water solution is used as an absorbent solution in an absorption refrigeration apparatus, the lithium bromide-water absorbent solution undergoes crystallization in an absorber when the concentration of the absorbent solution reaches a high level of 63.5 weight percent under the conditions of an absorbent solution temperature of 50° C. at a refrigerant evaporation temperature of 5° C. (in the case of a dual-effect absorption refrigeration apparatus, when the concentration reaches 66.5 weight percent). It is, therefore, impossible to use the above-described lithium bromide-water solution in such an absorption refrigeration apparatus. Also, if an absorbent solution which is maintained at a low concentration is made to absorb a vapor refrigerant at a low temperature in order to prevent the occurrence of crystallization, this means that the low-temperature absorbent solution is cooled and the temperature difference between cool air and ambient air (35° C.) becomes small. As a result, the cooling efficiency of cooling the absorbent solution lowers or the absorbent solution becomes impossible to cool. On the other hand, although water-cooled systems have been proposed, they require additional cool water supplying equipment, and hence their applications are limited in terms of installation costs and installation places. In addition, the water-cooled systems are not suitable for home use in views of the cost of cool water and the saving of water.

An investigation was made of some other types of absorbent solution in order to overcome the above-described disadvantages of the lithium bromide-water system and to enlarge the temperature difference between the evaporator and the absorber. An aqueous solution containing a system comprised of the lithium bromide-water system, zinc bromide and zinc chloride exhibited acidity and an extremely strong corrosive action. In a diluted one of this aqueous solution (10 weight percent or less), precipitates were produced due to the generation of zinc hydroxide. An aqueous solution containing a system comprised of the lithium bromide-water system and calcium bromide exhibited a strong corrosive action, and involved the disadvantage that precipitates were produced due to the addition of lithium hydroxide as an anti-corrosive agent. Although other components such as lithium thiocyanate and ethylene glycol were researched, they were not suitable for practical use because of their inferior heat resistance.

As described above, none of the lithium bromide-water absorbent solutions have been satisfactorily used with absorption refrigeration apparatus.

SUMMARY OF THE INVENTION

It is, therefore, an object of the present invention to provide an absorbent solution for use with an absorption refrigeration apparatus which has a high concentration but a low crystallization temperature.

It is another object of the present invention to provide an absorbent solution for use with an absorption refrigeration apparatus which has a crystallization temperature low enough to cause precipitation of neither lithium halide nor lithium nitrate during the operation cycle of the refrigeration apparatus, air-cooled absorption refrigeration apparatus which have heretofore been difficult to put into practical use being able to be operated with high safety and without any difficulties so that cool water is efficiently produced and utilized for cooling or refrigeration purposes, and which absorbent solution does not corrode the apparatus body, nor are precipitated even during a long period of use, but excels in heat resistance and durability.

It is yet another object of the present invention to provide an absorbent solution for use with an absorption refrigeration apparatus including a generator, a condenser, an evaporator and an absorber, the absorbent solution comprising water as a refrigerant and an absorbent and being a mixture of at least three lithium compounds selected from the group consisting of lithium bromide, lithium iodide, lithium chloride, and lithium nitrate.

BRIEF DESCRIPTION OF THE DRAWINGS

The invention will be better understood from the following description taken in conjunction with the accompanying drawings in which.

DESCRIPTION OF THE INVENTION

Absorption refrigeration apparatus of the type that provides refrigeration by directly consuming high temperature heat energy are widely used in views of their efficient and rational use of heat energy. Such an absorption refrigeration apparatus will be diagrammatically described below.

Figure 6:
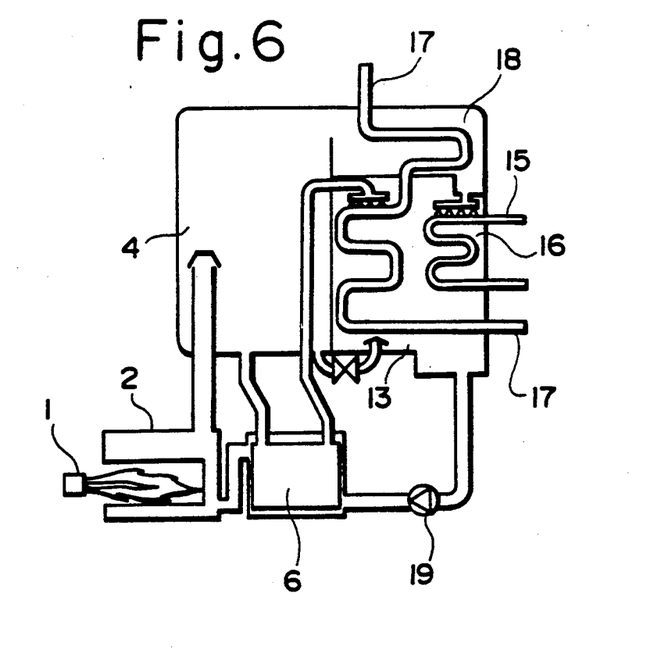
FIG. 6 is a schematic illustration of a single-effect absorption refrigeration apparatus to which the present invention can be applied.

Referring to FIG. 6 which schematically shows a typical example of an absorption refrigeration apparatus, a low-concentration absorbent solution which has absorbed a vapor refrigerant is heated by a heat source 1 in a heat temperature generator 2, and is fed to a separator 4 in which the refrigerant evaporates from the low-concentration absorbent solution so that the absorbent is condensed into a high-concentration absorbent solution. The high-concentration absorbent solution is fed to a heat exchanger 6 in which it exchanges heat with the low-concentration absorbent solution supplied from an absorber 13 which is maintained at a low temperature. The thus-cooled absorbent solution is conducted into the absorber 13. The high-concentration absorbent solution at a low temperature is sprayed in the absorber 13 and cooled by a cooling pipe 17 to absorb the vapor refrigerant produced by an evaporator 16, thereby forming a low-concentration absorbent solution. The low-concentration absorbent solution is pumped by a circulation pump 19 through the heat exchanger 6 into the high temperature generator 2. Subsequently, the absorbent solution is recycled in the above-described manner. The high temperature vapor refrigerant produced in the separator 4 is conducted into a condenser 18 in which the vapor refrigerant is cooled and condensed into a liquid refrigerant by the effect of the cooling pipe 17. The liquid refrigerant is supplied to the evaporator 16 in which it is evaporated, and water flowing through a cool-water pipe 15 is cooled by the effect of the latent heat due to the evaporation of the liquid refrigerant, whereby cool water is obtained. The vapor refrigerant is absorbed by the high-concentration absorbent solution in the absorber 13. The cool water is used for cooling the interior of a building or the like.

Figure 2A:
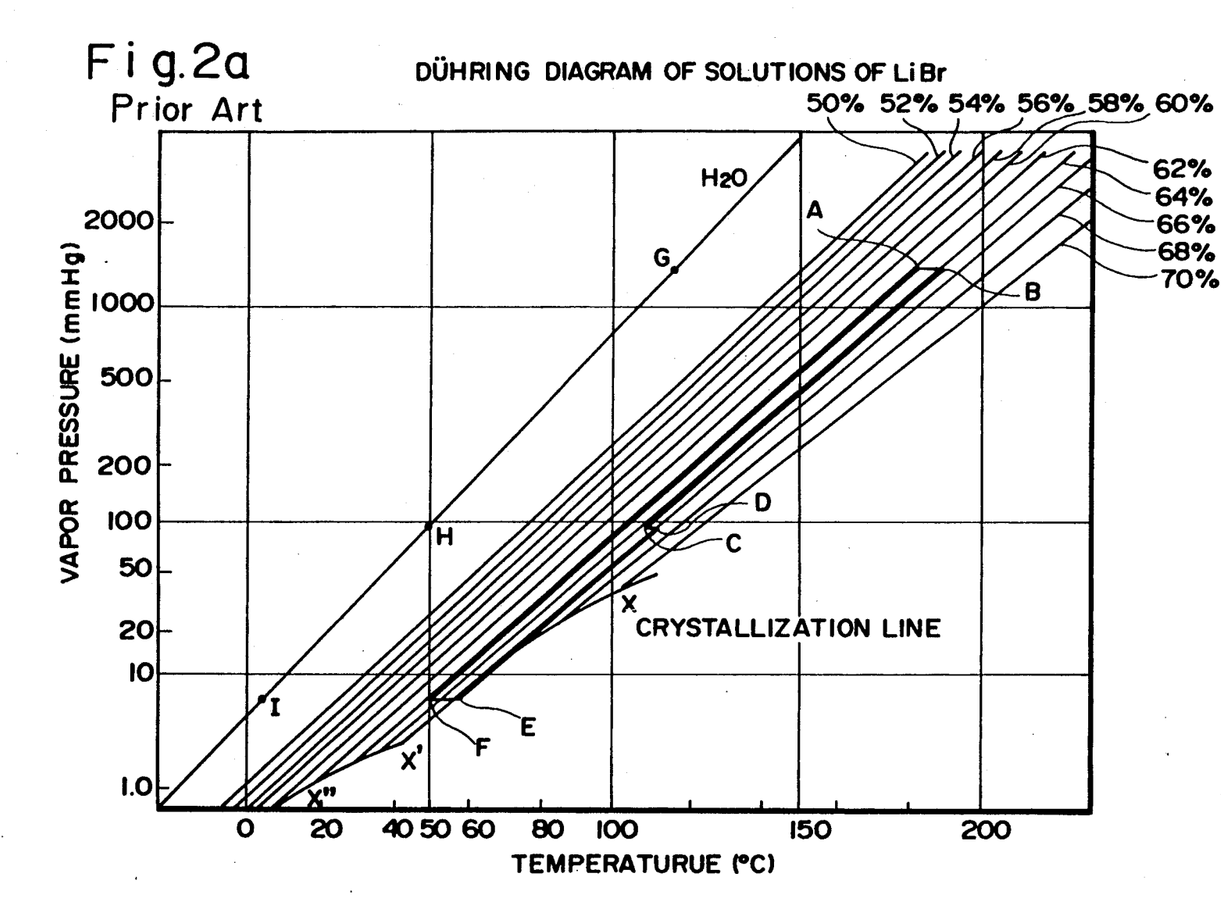
FIGS. 2a and 2b are Düring diagrams showing the prior art absorbent solutions.
Figure 2B:
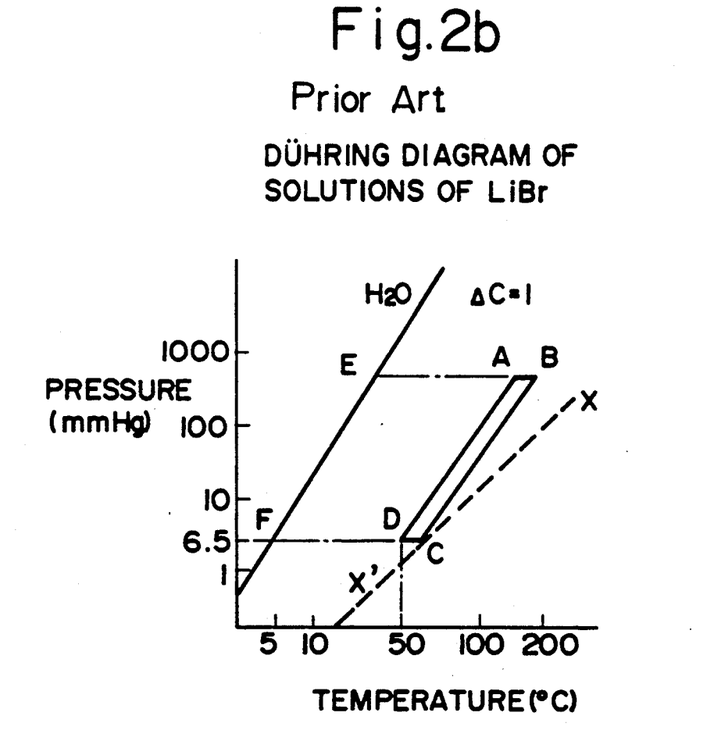

It is known that water and lithium bromide are used as the refrigerant and the absorbent, respectively. One example of the operating cycle employing such an absorbent composition is described below with reference to the Dühring diagram shown in FIG. 2b. FIG. 2b is a graphic illustration in which the concentration of lithium salt in water is used as a parameter, with the state of the operation cycle of the absorbent solution being represented by a cycle ABCD. As an example, it is assumed that straight lines AD and BC correspond to parameters of 62.5 weight percent and 63.5 weight percent, respectively. When an absorbent solution containing lithium bromide at a low concentration is supplied to the high temperature generator 2 by the circulation pump 19, some of the refrigerant is evaporated from the low-concentration absorbent solution and thus a high-concentration absorbent solution is obtained. Specifically, as shown in FIG. 2b, the low concentration absorbent solution is condensed from point A (a concentration of 62.5 weight percent) to point B. The vapor refrigerant is cooled by the cooling pipe 17 in the condenser 18, and is converted into a liquid in a state corresponding to point E. The condensation heat generated at this time is removed through the intermediary of water and transferred to a cooling tower, or removed through the intermediary of air to be directly passed to the ambient air. The high-concentration absorbent solution is cooled at point B, and reaches the state of point C in the absorber 13. In the absorber 13, the absorbent solution absorbs the vapor refrigerant which has been supplied from the evaporator 16 and which has a temperature of 5° C. corresponding to point F, thus being diluted into a low concentration absorbent solution corresponding to point D (a concentration of 62.5 weight percent). During this time, the water flowing through the cool-water pipe 15 is cooled in the evaporator 16, and the thus-obtained cool water is used for cooling the interior of a building or the like. Furthermore, in the absorber 13, the high-concentration absorbent solution absorbs the vapor refrigerant and generates heat, and the heat is transferred to the cooling tower or the ambient air through the intermediary of water or air. The diluted low-concentration absorbent solution undergoes heat exchange with the high-concentration absorbent solution in the heat exchanger 6, and is returned to the high temperature generator 2 in which the diluted absorbent solution is heated from point D to point A and is recycled.

However, in the above-described prior art, if the refrigerant evaporation temperature in the evaporator 16 is 5° C. (point F), in order to satisfy the condition (e.g., air-cooling condition) in which the absorbent solution which absorbs the refrigerant in the absorber 13 is cooled to a temperature of 50° C., it is necessary that the concentration of low-concentration absorbent solution (point D) be 62.5 weight percent so as to prevent the high concentration absorbent solution from undergoing crystallization at point C. In order to prevent the crystallization of the absorbent solution, the state of the high-concentration absorbent solution (point C) must not be superimposed on crystallization line X—X'. To this end, it is necessary that the concentration of the absorbent solution at point C be 63.5 weight percent, that is, the concentration difference ($\Delta c$) must be made equal to or less than 1 weight percent.

If the concentration difference ($\Delta c$) is made equal to or less than 1 weight percent, the quantity of absorbent solution to be circulated must be increased. This leads to a degradation in result coefficient (the amount $Q_E$ of heat absorbed in the evaporator/the amount $Q_G$ of heat generated in the generator), and hence a lowering in the refrigeration efficiency. In addition, if operation of a refrigeration apparatus is stopped at such a level of concentration, there is a risk of crystallization since the temperature of the absorbent solution having this concentration will fall to an ambient air temperature. Accordingly, it is very dangerous to operate the refrigeration cycle under such conditions.

Dual-effect absorption refrigeration apparatus of the type having improved refrigeration efficiency are widely used. The following is a description of a dual-effect absorption refrigeration apparatus.

Figure 5:
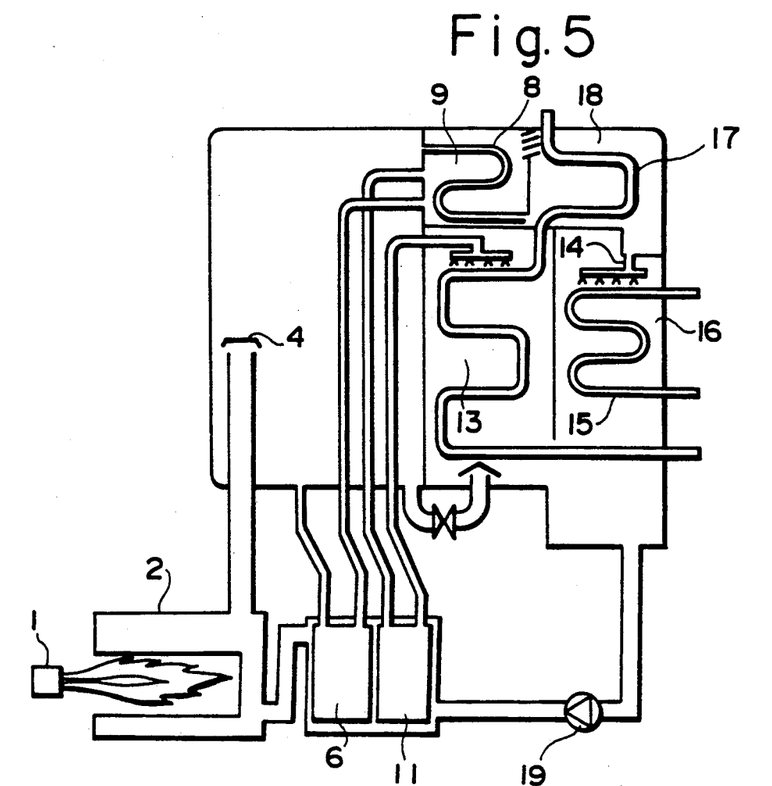
FIG. 5 is a schematic illustration of a dual-effect absorption refrigeration apparatus to which the present invention can be applied.

FIG. 5 schematically shows a typical example of the dual effect absorption refrigeration apparatus, in which the same reference numerals are used to denote the same elements used in the apparatus shown in FIG. 6.

Referring to FIG. 5, a low-concentration absorbent solution which has absorbed a vapor refrigerant is heated by the heat source 1 in the heat temperature generator 2, and is fed to the separator 4 in which the refrigerant evaporates from the low-concentration absorbent solution so that the absorbent is condensed into a middle-concentration absorbent solution. The middle-concentration absorbent solution is fed to the high temperature heat exchanger 6 in which it exchanges heat with the low-concentration absorbent solution supplied from the absorber 13 which is maintained at low temperatures, then fed to a low temperature generator 9. In the low temperature generator 9, the middle-concentration absorbent solution is heated by contact with a vapor refrigerant conduit 8 through which the vapor refrigerant from the separator 4 circulates, and the remaining refrigerant in the absorbent solution is further evaporated to form a high-concentration absorbent solution. Then, the high-concentration absorbent solution is fed to a low-temperature heat exchanger 11 in which it is cooled by heat exchange with the low-concentration absorbent solution having a low temperature, and is then conducted into the absorber 13. The high-concentration absorbent solution at a low temperature is sprayed in the absorber 13 and is cooled by the cooling pipe 17 to absorb the vapor refrigerant produced by the evaporator 16, thereby forming a low-concentration absorbent solution. The low-concentration absorbent solution is pumped by the circulation pump 19 through the heat exchangers 11 and 6 into the high temperature generator 2. Subsequently, the absorbent solution is recycled in the above-described manner. The high-temperature vapor refrigerant produced in the separator 4 is conducted through the vapor refrigerant conduit 8 into the condenser 18 in which the vapor refrigerant is cooled and condensed into a liquid refrigerant by the effect of the cooling pipe 17. The liquid refrigerant is supplied to the evaporator 16 in which it is evaporated, and water flowing through the cool-water pipe 15 is cooled by the effect of the latent heat due to the evaporation of the liquid refrigerant so that cool water is obtained. The vapor refrigerant is absorbed by the high-concentration absorbent solution in the absorber 13. The cool water is used for cooling the interior of a building or the like.

It is known that water and lithium bromide are used as the refrigerant and the absorbent, respectively. One example of the operation cycle employing such an absorbent composition is described below with reference to the Dühring diagram shown in FIG. 2a. FIG. 2a is a graphic illustration of the relationship between temperature and vapor pressure, in which the concentrations of lithium bromide in water are used as parameters, with the state of the operation cycle of the absorbent solution being represented by a cycle ABCDEF. An absorbent solution containing lithium bromide at a low concentration is supplied to the high temperature generator 2 by the circulation pump 19 and, in the high temperature generator 2, the low-concentration absorbent solution is heated to boil off some of the refrigerant, thereby forming the absorbent solution having a relatively high concentration (a middle-concentration absorbent solution). It is assumed hereinbelow that operation is performed under the following conditions. As shown in FIG. 2a, the absorbent solution is condensed from point A (a concentration of 62.5 weight percent) to point B (a concentration of 64.5 weight percent). The vapor refrigerant thus obtained is fed to the low temperature generator 9 in which it is condensed in the state of point G to generate condensation heat. The middle-concentration absorbent solution is heated by the effect of the condensation heat in the low temperature generator 9 and is condensed from point C (a concentration of 64.5 weight percent) to point D (a concentration of 66.5 weight percent) to form a high-concentration absorbent solution. The vapor refrigerant is cooled by the effect of the cooling pipe 17 in the condenser 18, and is converted into a liquid in a state represented by point H. The condensation heat generated at this time is removed through the intermediary of water to be transferred to a cooling tower, or removed through the intermediary of air to be passed directly to the ambient air. The high-concentration absorbent solution is cooled and fed to the absorber 13. The absorbent solution passes through an inlet of the absorber 13 in the state of point E (a concentration of 66.5 weight percent and a temperature of 58° C.). In the absorber 13, the absorbent solution absorbs a vapor refrigerant of point I (a temperature of 5° C. and a vapor pressure of 6.5 mmHG), and is diluted with the absorbed vapor refrigerant. The diluted solution passes through an outlet of the absorber 13 in the state of a low-concentration absorbent solution corresponding to point F (a concentration of 62.5 weight percent and a temperature of 50° C.). During this time, in the evaporator 16, water flowing through the cool-water pipe 15 is cooled, and the thus-obtained cool water is used for cooling the interior of a building or the like. Furthermore, in the absorber 13, the high-concentration absorbent solution absorbs the vapor refrigerant and generates heat, and the heat is transferred to the cooling tower or the ambient air through the intermediary of water or air passing through the cooling pipe 17. The diluted low-concentration absorbent solution undergoes heat exchange with the high-concentration absorbent solution and the middle-concentration absorbent solution in the heat exchangers 11 and 6, and is returned to the high temperature generator 2. Subsequently, the absorbent solution is recycled.

However, in the above-described prior art, to satisfy the condition (air-cooling condition) of lowering a vapor evaporation temperature in the evaporator 16 to a temperature of 5° C. (point I) and cooling the absorbent solution in the absorber 13 to a temperature of 50° C., it is necessary that the concentration of the low-concentration absorbent solution be 62.5 weight percent (point F). If it is assumed that the concentration difference between the low-concentration absorbent solution and the high-concentration absorbent solution is 4 weight percent, it is necessary that the concentration of the high-concentration absorbent solution be 66.5 weight percent. However, the lithium bromide solution undergoes crystallization at the above-described temperature.

Figure 3:
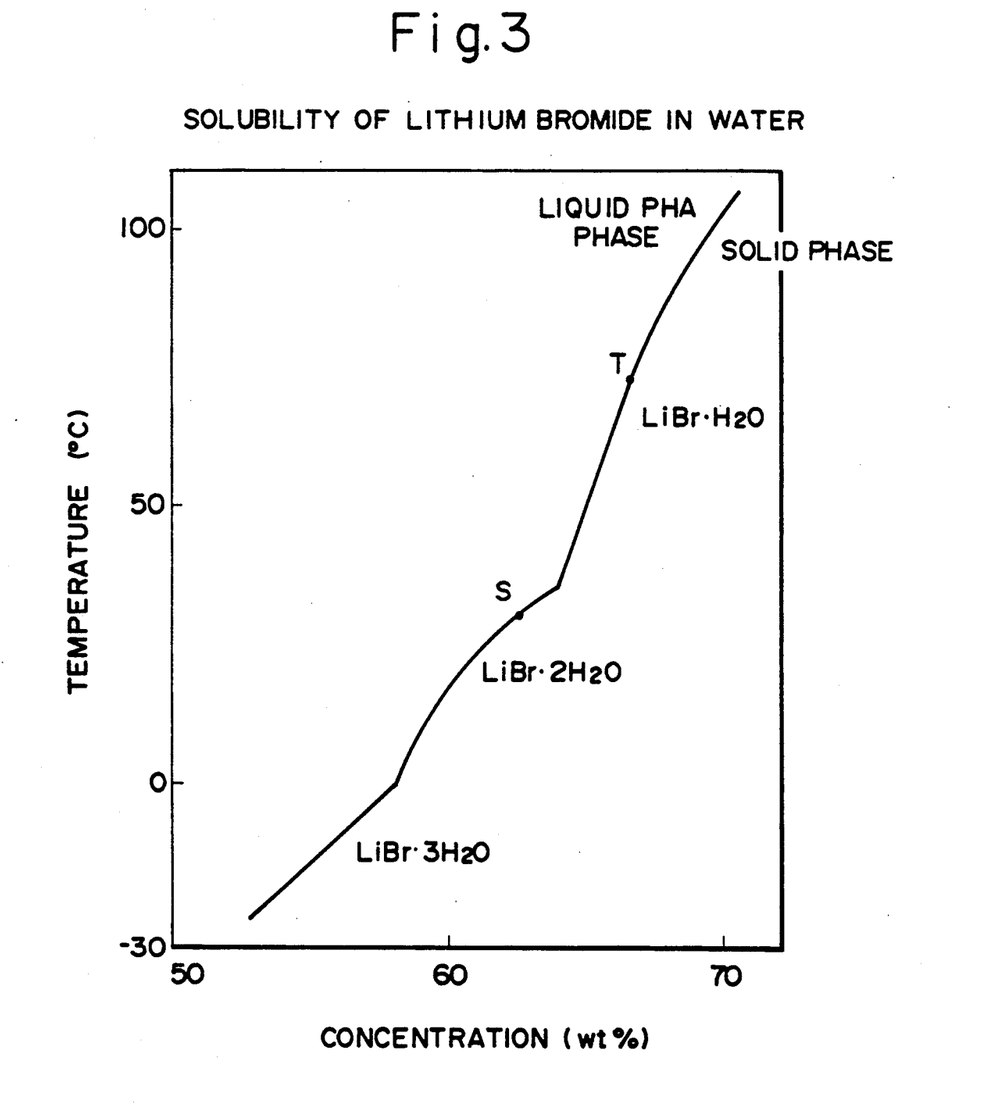
FIG. 3 is a graphic representation of the solubility of lithium bromide in water.

FIG. 3 shows the solubility curve of lithium bromide in water. It will be understood from FIG. 3 that the crystallization temperatures of the low-concentration (62.5 weight percent) absorbent solution and the high-concentration (66.5 weight percent) absorbent solution are 33° C. (point S) and 71° C. (point T), respectively. Lithium bromide is not at all dissolved in water when the temperature of the high-concentration absorbent solution (66.5 weight percent) is 50° C. Therefore, as shown in FIG. 2a, since point E assumes no position in the range defined by crystallization line X—X'—X'', crystallization takes place, and this makes it impossible to carry out the operation of the cooling cycle.

If the concentration of the high-concentration absorbent solution of the lithium bromide solution is a value which does not exceed its solubility limit, for example, 64.5 weight percent, the concentration difference between the low-concentration absorbent solution (62.5 weight percent) and the high-concentration absorbent solution (64.5 weight percent) is 2 weight percent. At such a level of concentration difference, the quantity of absorbent solution to be circulated must be increased. This leads to a degradation in result coefficient (the amount $Q_E$ of heat absorbed in the evaporator/the amount $Q_G$ of heat generated in the generator), and hence a lowering in the refrigeration efficiency. In addition, if operation of a refrigeration apparatus is stopped at such a level of concentration, there is a risk of crystallization since the temperature of the absorbent solution having this concentration will fall to an ambient air temperature. Accordingly, it is very dangerous to operate the refrigeration cycle under such conditions.

Furthermore, with reference to point S in FIG. 3, consideration will be given to an operation cycle performed under the condition in which the crystallization temperature of the high-concentration absorbent solution does not fall to 30° C. or less. If the high-concentration absorbent solution has a concentration of 62 weight percent and the concentration difference between the high-concentration and low-concentration absorbent solutions is 4 weight percent, the concentration of the low-concentration absorbent solution is 58 weight percent. In order to, under this condition, make the low-concentration absorbent solution absorb a vapor refrigerant at an evaporation temperature of 5° C., it is understood from the Dühring diagram of FIG. 2a that the absorbent solution within the absorber requires a temperature of 40° C. Accordingly, if the absorbent solution is to be cooled by ambient air (35° C.), a temperature difference of more than 5° C. cannot be achieved. For this reason, since a heat exchanger of significant size is needed, this prior art method is not an impractical one, either.

An absorbent solution for use with an absorption refrigeration apparatus including a generator, a condenser, an evaporator and an absorber, comprises water as a refrigerant and an aqueous solution of a mixture as an absorbent, the mixture including at least three lithium compounds selected from the group consisting of lithium bromide, lithium iodide, lithium chloride, and lithium nitrate. Preferably, the mixture as the absorbent is composed of the three components of lithium bromide, lithium iodide and lithium chloride, and the weight ratio of lithium bromide to lithium iodide to lithium chloride in the mixture is 1:0.1–1.0:0.05–0.50. More preferably, the weight ratio in the mixture may be 1:0.2–0.5:0.15–0.23.

The above-described absorbent solution may be an aqueous solution comprised of the three components of lithium bromide, lithium iodide and lithium nitrate, and the weight ratio of lithium bromide to lithium iodide to lithium nitrate in the mixture is 1:0.1–1.0:0.05–0.50. More preferably, the weight ratio in the mixture may be 1:0.4–0.6:0.10–0.30.

The above-described absorbent solution may be an aqueous solution comprised of the three components of lithium bromide, lithium chloride and lithium nitrate, and the weight ratio of lithium bromide to lithium iodide to lithium nitrate in the mixture is 1:0.05–0.50:0.05–0.50. More preferably, the weight ratio in the mixture may be 1:0.2–0.3:0.1–0.3.

The above-described absorbent solution may be an aqueous solution comprised of the four components of lithium bromide, lithium iodide, lithium chloride, and lithium nitrate, and the weight ratio of lithium bromide to lithium iodide to lithium chloride to lithium nitrate in the mixture is 1:0.1–1.0:0.05–0.50:0.05–050. More preferably, the weight ratio in the mixture may be 1:0.4–0.6:0.1–0.3:0.1–0.3.

If the weight ratio is not within any of the above-described ranges, the greater the deviation therefrom the higher the crystallization temperature of the aqueous solution at an equal vapor pressure Therefore, the resultant solution is not suitable for use as the aqueous solution described above.

The absorbent solution in accordance with the present invention is an aqueous solution containing a mixture of at least three components selected from the group consisting of lithium bromide, lithium iodide, lithium chloride, and lithium nitrate, the crystallization temperature of the present aqueous solution being lower than that of an aqueous solution containing lithium bromide alone (hereinafter referred to as a "lithium bromide-water solution").

FIGS. 4a to 4d are graphic representations of the relationships between the vapor pressures and crystallization temperatures of the present aqueous solutions when the temperature of each of the aqueous solutions is 50° C.

Figure 4A:
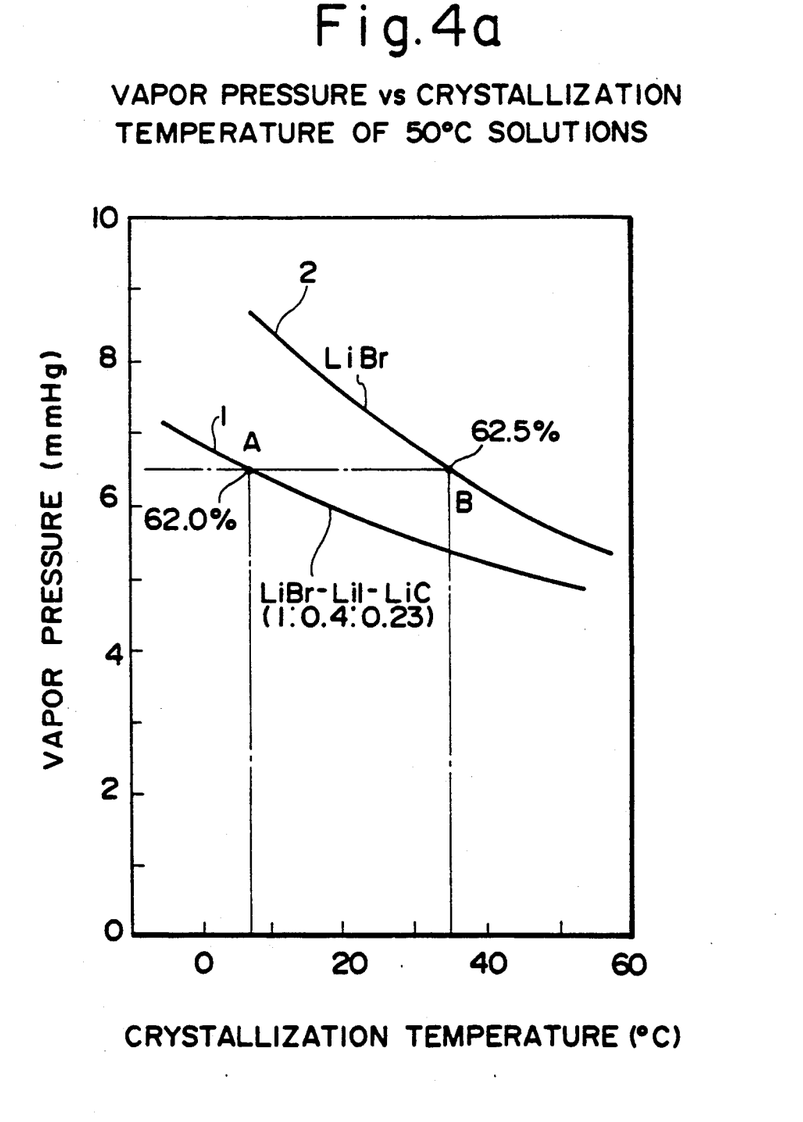
FIGS. 4a to 4d are graphic representations of the relationships between vapor pressure and crystallization temperature in several examples of the 50° C. absorbent solutions in accordance with the present invention.

In FIG. 4a, curve 1 represents the present inventive aqueous solution of a mixture composed of lithium bromide, lithium iodide and lithium chloride, and curve 2 represents the prior art lithium bromide-water solution. The crystallization temperature of the present inventive aqueous solution at a vapor pressure of 6.5 mmHg when the evaporation temperature of water as the refrigerant is 5° C. corresponds to point A on curve 1 while the crystallization temperature of the prior art lithium bromide solution under the same condition corresponds to point B on curve 2. The crystallization temperature of the former is 7° C. and that of the latter is 33° C. Accordingly, the use of the aqueous solution of the present invention enables the crystallization temperature to be made 26° C. lower than that of the prior art lithium bromide-water solution.

Figure 4B:
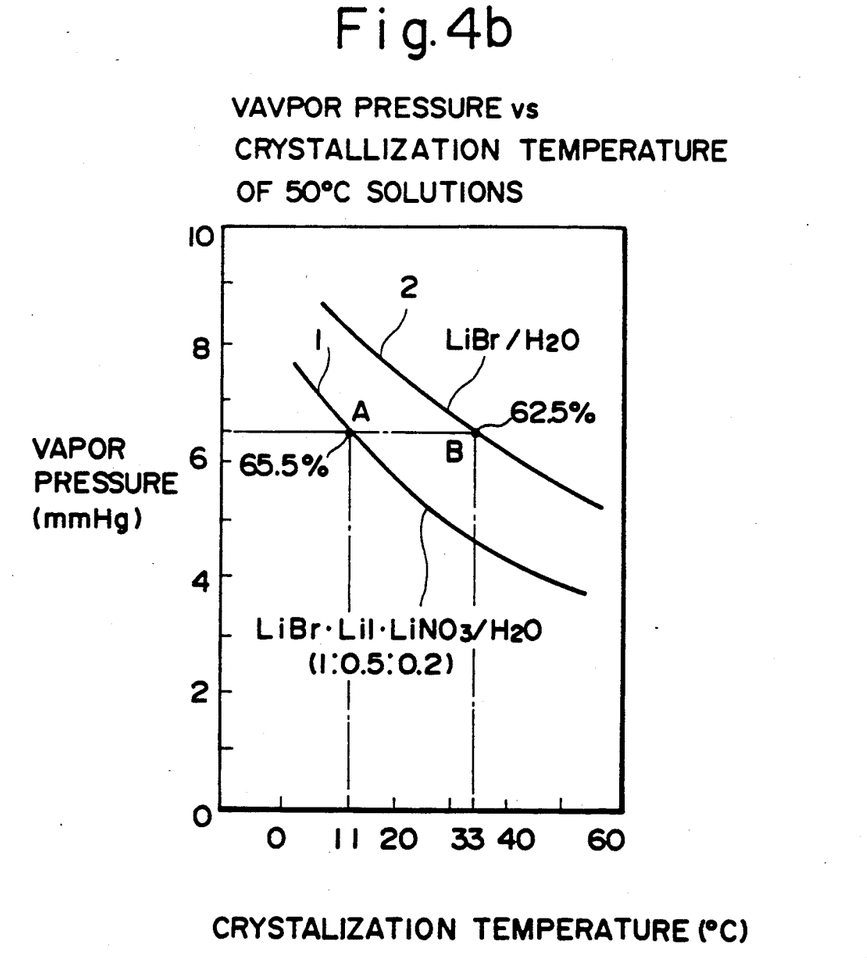

In FIG. 4b, curve 1 represents the present inventive aqueous solution of a mixture composed of lithium bromide, lithium iodide and lithium chloride, and curve 2 represents the prior art lithium bromide-water solution. The crystallization temperature of the present inventive aqueous solution at a vapor pressure of 6.5 mmHg when the evaporation temperature of water as the refrigerant is 5° C. corresponds to point A on curve 1 while the crystallization temperature of the prior art lithium bromide solution under the same condition corresponds to point B on curve 2. The crystallization temperature of the former is 11° C. and that of the latter is 33° C. Accordingly, the use of the aqueous solution of the present invention enables the crystallization temperature to be made 22° C. lower than that of the prior art lithium bromide-water solution.

Figure 4C:
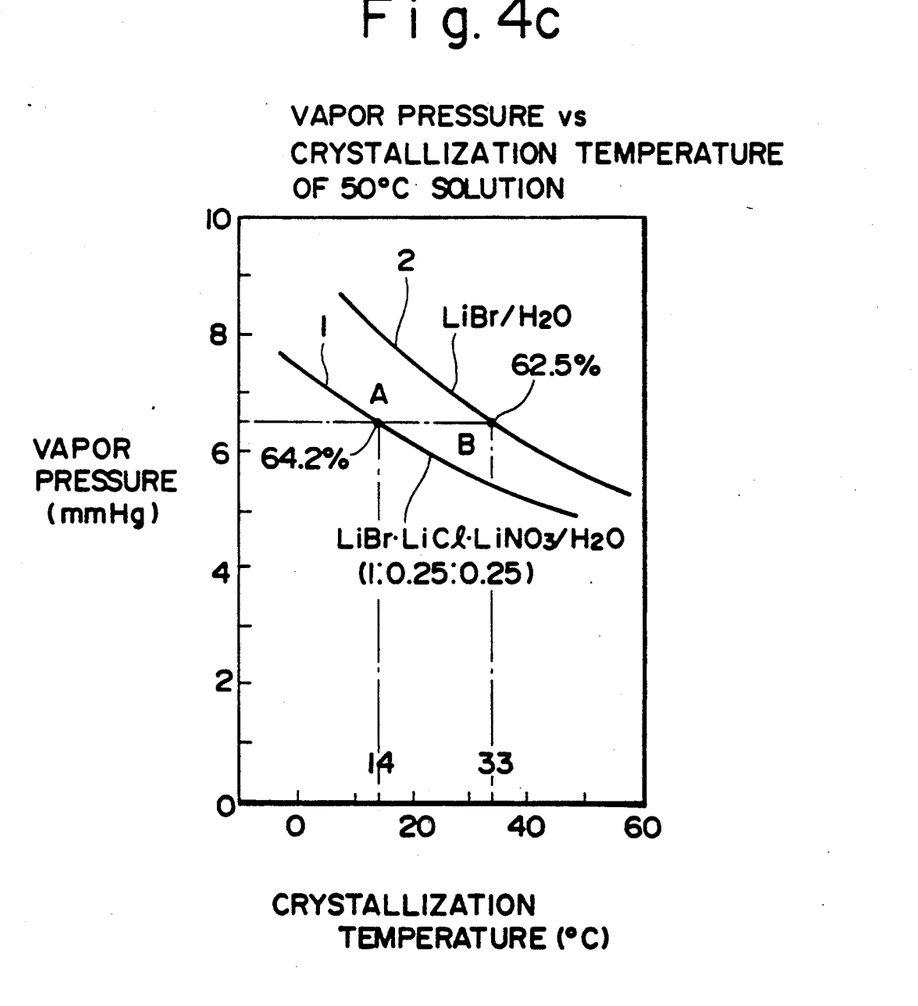

In FIG. 4c, curve 1 represents the present inventive aqueous solution of a mixture composed of lithium bromide, lithium chloride and lithium nitrate, and curve 2 represents the prior art lithium bromide-water solution. The crystallization temperature of the present inventive aqueous solution at a vapor pressure of 6.5 mmHg when the evaporation temperature of water as the refrigerant is 5° C. corresponds to point A on curve 1 while the crystallization temperature of the prior art lithium bromide solution under the same condition corresponds to point B on curve 2. The crystallization temperature of the former is 14° C. and that of the latter is 33° C. Accordingly, the use of the aqueous solution of the present invention enables the crystallization temperature to be made 19° C. lower than that of the prior art lithium bromide-water solution.

Figure 4D:
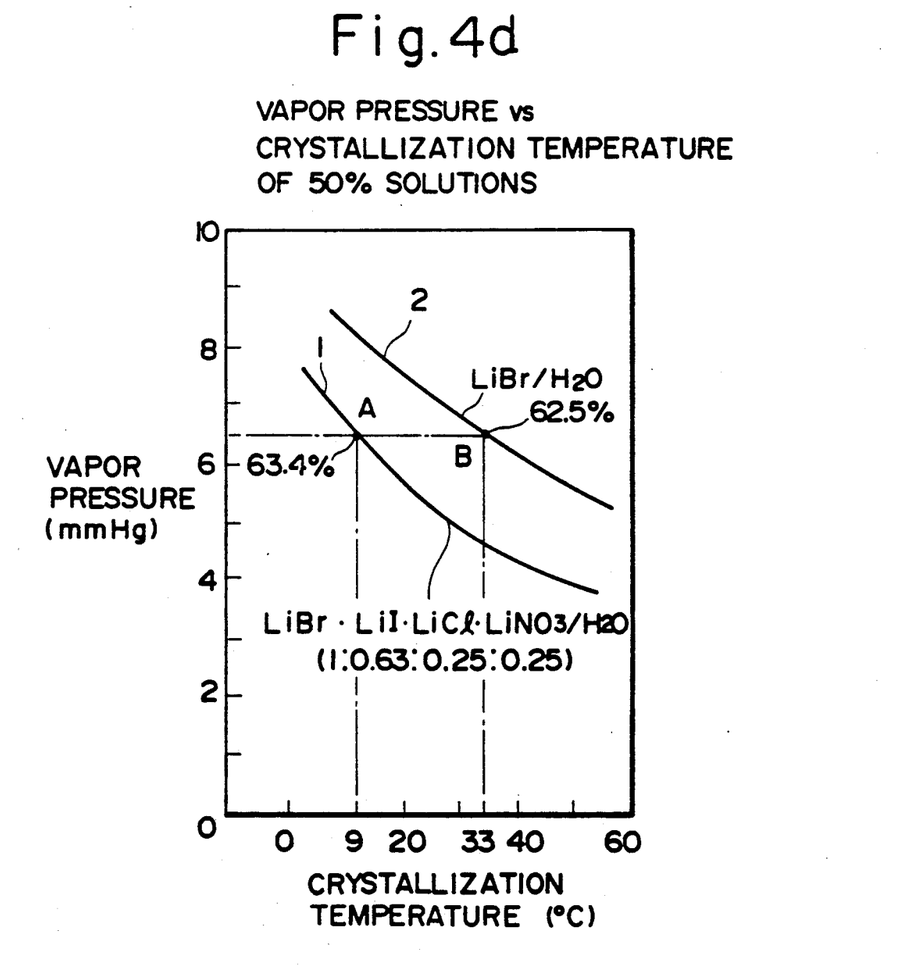

In FIG. 4d, curve 1 represents the present inventive aqueous solution of a mixture composed of lithium bromide, lithium iodide, lithium chloride and lithium nitrate, and curve 2 represents the prior art lithium bromide-water solution. The crystallization temperature of the present inventive aqueous solution at a vapor pressure of 6.5 mmHg when the evaporation temperature of water as the refrigerant is 5° C. corresponds to point A on curve 1 while the crystallization temperature of the prior art lithium bromide solution under the same condition corresponds to point B on curve 2. The crystallization temperature of the former is 9° C. and that of the latter is 33° C. Accordingly, the use of the aqueous solution of the present invention enables the crystallization temperature to be made 24° C. lower than that of the prior art lithium bromide-water solution.

As described above, the lithium bromide-water solution exhibits a high crystallization temperature and its solubility is limited. If such a lithium bromide-water solution is employed, absorption temperature needs to be lowered by using a low-concentration aqueous solution of lithium bromide. For this reason, the difference between absorption temperature and ambient air temperature becomes small and it is therefore difficult to cool the absorption solution by air.

Table 1 shows the solution properties of absorbent solutions in accordance with the present invention. Table 1 further includes the solution properties of a lithium bromide-water solution as a comparative example. It is evident from Table 1 that any of the absorbent solutions according to the present invention has a low crystallization temperature with respect to its crystallization temperature as compared with the absorbent solution of the comparative example.

TABLE I

| SOLUTION | (SOLUTION PROPERTIES) | | |
|---|---|---|---|
| | CONCENTRATION (wt %) | CRYSTALLIZATION TEMPERATURE (°C.) | VAPOR PRESSURE (mm Hg; 50° C.) |
| $LiBr-LiI-LiNO_3-H_2O$ | 67.7 | 26.5 | 5.0 |
| ($LiBr-LiI-LiNO_3$ = 1:0.5:0.2) | 65.1 | 8.5 | 6.9 |
| $LiBr-LiI-LiNO_3-H_2O$ | 68.2 | 29.6 | 5.1 |
| ($LiBr-LiI-LiNO_3$ = 1:0.4:0.15) | 65.5 | 17.5 | 6.1 |
| $LiBr-LiI-LiCl-H_2O$ | 62.0 | 10.6 | 6.3 |
| ($LiBr-LiI-LiCl$ = 1:0.4:0.15) | 63.3 | 32.9 | 5.4 |
| $LiBr-LiI-LiCl-H_2O$ | 61.7 | 4.2 | 6.7 |
| ($LiBr-LiI-LiCl$ = 1:0.4:0.23) | 63.7 | 32.6 | 5.5 |
| $LiBr-LiCl-LiNO_3/H_2O$ | 63.5 | 8.0 | 6.9 |
| (= 1:0.25:0.25) | 65.7 | 28.5 | 5.7 |
| $LiBr-LiCl-LiNO_3/H_2O$ | 61.0 | 9.5 | 6.9 |
| (= 1:0.25:0.125) | 67.7 | 17.3 | 6.1 |
| $LiBr-LiI-LiCl-LiNO_3/H_2O$ | 63.6 | 0.5 | 7.5 |
| ($LiBr-LiI-LiCl-LiNO_3$ = 1:0.5:0.1:0.1) | 67.0 | 29.8 | 4.5 |
| $LiBr-LiI-LiCl-LiNO_3/H_2O$ | 62.0 | 1.9 | 7.8 |
| ($LiBr-LiI-LiCl-LiNO_3$ = 1:0.63:0.25:0.25) | 65.5 | 25.2 | 5.0 |
| $LiBr-H_2O$ | 62.7 | 33 | 6.5 |

Similar to the lithium bromide-water solution, either of the lithium iodide-water solution or the lithium chloride-water solution exhibits a higher crystallization temperature than that of the absorbent solution of the present invention. A two-component aqueous solution of lithium bromide and lithium iodide exhibits a crystallization temperature which is lower than that of the lithium bromide-water solution but higher than that of the present inventive aqueous solution containing a mixture composed of at three lithium compounds selected from the group consisting of lithium bromide, lithium iodide, lithium chloride and lithium nitrate.

As a matter of course, the combinations of the refrigerant and the absorbents in accordance with the present invention can be applied to absorption refrigeration apparatus of a conventional type employing water-lithium bromide systems. In this case, since a lower crystallization temperature than that of the prior art absorbent solution is achieved, a very safe operation is enabled, and a large temperature difference between cooling water temperature and absorber temperature can be achieved. Therefore, in accordance with the present invention, it is possible to provide various economical merits such as a reduction in an area required for heat exchange.

EXAMPLE 1

Figure 1A:
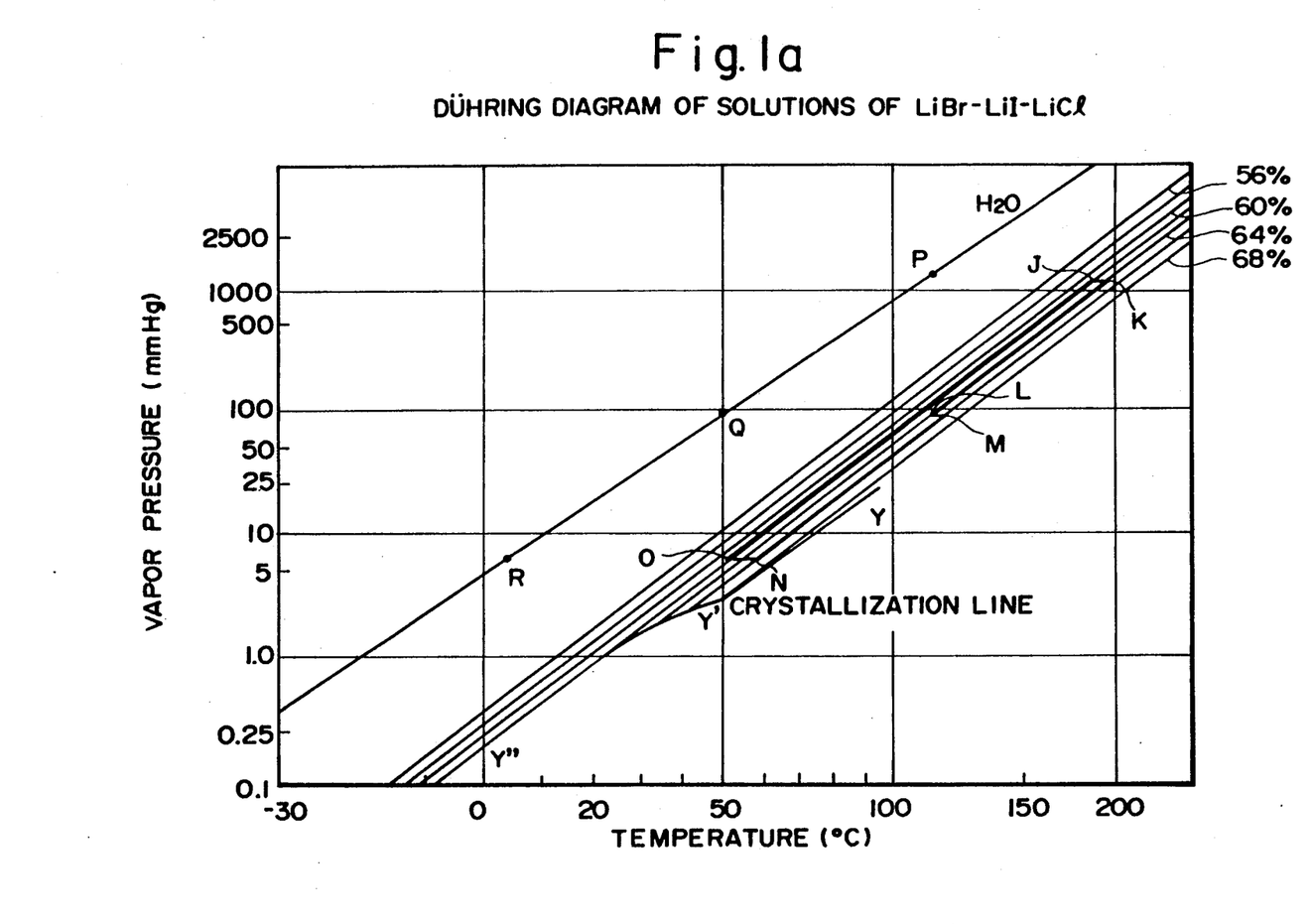
FIGS. 1a to 1d are Dühring diagrams showing several examples of absorbent solutions in accordance with the present invention.

An aqueous solution of a mixture composed of lithium bromide, lithium iodide and lithium chloride in a weight ratio of 1:0.4:0.15 was prepared as an absorbent solution. The aqueous solution was used with the dual effect absorption refrigeration apparatus described above in conjunction with FIG. 5, and the cooling operation was performed. The state of the operation cycle of the aqueous solution of the mixture of lithium bromide, lithium iodide and lithium chloride was shown in FIG. 1a by using a Dühring diagram of the mixture-water solution. FIG. 1a is a Dühring diagram similar to FIG. 1a which shows the state of operating cycle, and graphically illustrates the relationship between temperature and vapor pressure. The conditions under which the absorbent solution absorbs a vapor refrigerant (water vapor) were a vapor refrigerant temperature: 5° C., an absorbent solution temperature: 50° C., and the concentration difference ($\Delta c$) in the absorbent solution before and after the absorption of the vapor refrigerant: 4 weight percent. The operation was similar to that employing the above-described lithium bromide-water solution.

In the high temperature generator 2, a low-concentration absorbent solution (61.5 weight percent) is heat from point J to point K, and the low-concentration absorbent solution is converted into a middle-concentration absorbent solution (63.5 weight percent) as the result of the evaporation of water from the low-concentration absorbent solution. Further, the middle-concentration absorbent solution is heated by the heat of condensation of water vapor in the low temperature generator 9, and is condensed from point L to point M to form a high-concentration absorbent solution (65.5 weight percent). Then, the high-concentration absorbent solution is cooled in the absorber 13 in which it absorbs water (5° C. and 6.5 mmHg) evaporated at point N (58° C.) and is thereby diluted to form a low-concentration absorbent solution (61.5 weight percent) indicated at point 0 (50° C.). Further, the low-concentration absorbent solution is heated from point O to point J, and is then recycled. During this time, water flowing in the cool-water pipe 15 is cooled by a low-temperature vapor refrigerant in the evaporator 16, and thus-cooled water are used for cooling purposes.

The temperature of the three-component mixture absorbent solution used in Example 1 described above is not superimposed on crystallization line Y-Y'-Y" as represented by points N and O. Therefore, the absorption temperature of the absorbent solution of Example 1 is higher than the crystallization temperature of the same, and the absorbent solution assumes a complete solution state without involving the precipitation of lithium halide. In contrast, in the cycle operation of the lithium bromide-water solution described previously in conjunction with FIG. 2, this absorbent solution assumes point E in the absorber and is partially superimposed on crystallization line X—X'—X". This makes it impossible to continue the operation of the apparatus. However, if the absorbent solution of Example 1 is employed, absorption refrigeration apparatus can operate in air-cooled conditions without any difficulties.

EXAMPLE 2

Figure 1B:
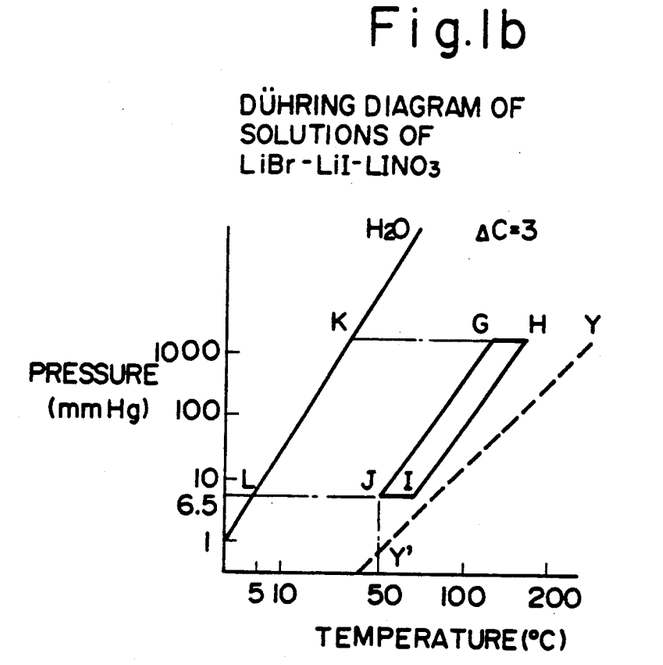

An aqueous solution of a mixture composed of lithium bromide, lithium iodide and lithium nitrate in a weight ratio of 1:0.5:0.2 was prepared as an absorbent solution. The aqueous solution was used with the absorption refrigeration apparatus described previously in conjunction with FIG. 5, and the cooling operation was performed. An operation cycle GHIJ of the aqueous solution of the mixture of lithium bromide, lithium iodide and lithium nitrate was shown in FIG. 1b by using a Dühring diagram of the mixture-water solution. FIG. 1b is a Dühring diagram similar to FIG. 2b which shows the state of operating cycle, and graphically illustrates the relationship between temperature and vapor pressure. The conditions under which the absorbent solution absorbs a vapor refrigerant (water vapor) were a vapor refrigerant temperature: 5° C., an absorbent solution temperature: 50° C., and the concentration difference ($\Delta c$) in the absorbent solution before and after the absorption of the vapor refrigerant: 3 weight percent. The operation was similar to that employing the lithium bromide-water solution described previously.

In the high temperature generator 2, a low-concentration absorbent solution (65.5 weight percent) is heated from point G to point H, and the low-concentration absorbent solution is converted into a high-concentration absorbent solution (68.5 weight percent) as the result of the evaporation of water from the low-concentration absorbent solution. Then, the high-concentration absorbent solution is cooled to point I in the absorber 13 in which it absorbs water vapor (point L, a temperature of 5° C. and a vapor pressure of 6.5 mmHg) and is thereby diluted to form a 50° C. low-concentration absorbent solution (65.5 weight percent) indicated at point J. Further, the low-concentration absorbent solution is heated from point J to point G, and is then recycled. During this time, water flowing in the cool-water pipe 15 is cooled by a low-temperature vapor refrigerant in the evaporator 16, and the thus-cooled water are used for cooling purposes.

The temperature of the three-component mixture absorbent solution used in Example 2 described above is not superimposed on crystallization line Y—Y' as represented by points I and J. Therefore, the absorption temperature of the absorbent solution of Example 2 is higher than the crystallization temperature of the same, and the absorbent solution assumes a complete solution state without involving the precipitation of any of lithium bromide, lithium iodide and lithium halide. In contrast, in the cycle operation of the lithium bromide-water solution described previously in conjunction with FIG. 2b, this absorbent solution assumes point C (a concentration of 63.5 weight percent) in the absorber and is partially superimposed on crystallization line X—X'. This makes it impossible to continue the operation of the apparatus and to assure a concentration difference of more than 1 weight percent. However, if the absorbent solution of Example 2 is employed, absorption refrigeration apparatus can operate in air-cooled conditions without any difficulties.

EXAMPLE 3

Figure 1C:
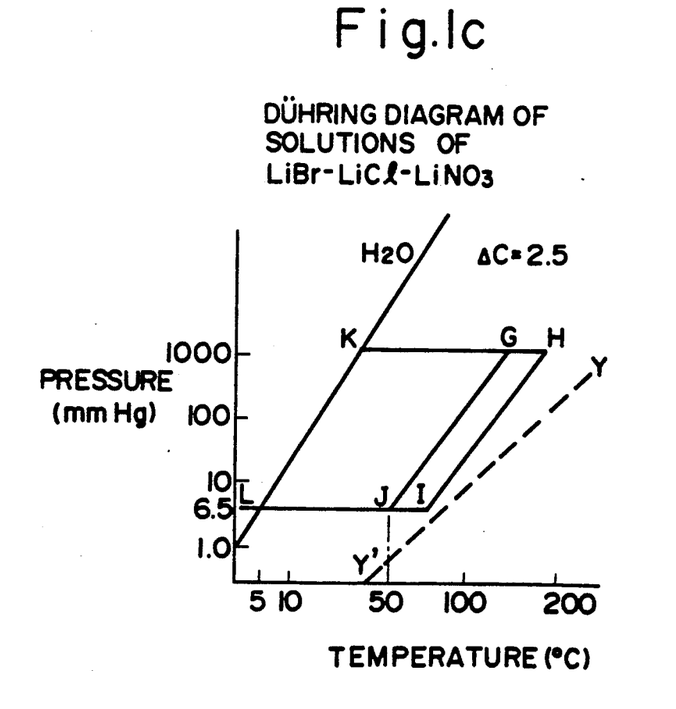

An aqueous solution of a mixture composed of lithium bromide, lithium chloride and lithium nitrate in a weight ratio of 1:0.25:0.25 was prepared as an absorbent solution. The aqueous solution was used with the absorption refrigeration apparatus described previously in conjunction with FIG. 6, and the cooling operation was performed. An operation cycle GHIJ of the aqueous solution of the mixture of lithium bromide, lithium chloride and lithium nitrate was shown in the Dühring diagram of FIG. 1c. FIG. 1c is a Dühring diagram similar to FIG. 2b which shows the state of operating cycle, and graphically illustrates the relationship between temperature and vapor pressure. The conditions under which the absorbent solution absorbs a vapor refrigerant (water vapor) were a vapor refrigerant temperature: 5° C., an absorbent solution temperature: 50° C., and the concentration difference (Δc) in the absorbent solution before and after the absorption of the vapor refrigerant: 2.5 weight percent. The operation was similar to that employing the lithium bromide-water solution described previously.

In the high temperature generator 2, a low-concentration absorbent solution (64.2 weight percent) is heated from point G to point H, and the low-concentration absorbent solution is converted into a high-concentration absorbent solution (66.7 weight percent) as the result of the evaporation of water from the low-concentration absorbent solution. Then, the high-concentration absorbent solution is cooled to point I in the absorber 13 in which it absorbs water vapor (point L, a temperature of 5° C. and a vapor pressure of 6.5 mmHg) and is thereby diluted to form a 50° C. low-concentration absorbent solution (64.2 weight percent) indicated at point J. Further, the low-concentration absorbent solution is heated from point J to point G, and is then recycled. During this time, water flowing in the cool-water pipe 15 is cooled by a low-temperature vapor refrigerant in the evaporator 16, and the thus-cooled water are used for cooling purposes.

The temperature of the three-component mixture absorbent solution used in Example 3 described above is not superimposed on crystallization line Y—Y' as represented by points I and J. Therefore, the absorption temperature of the absorbent solution of Example 3 is higher than the crystallization temperature of the same, and the absorbent solution assumes a complete solution state without involving the precipitation of any of lithium bromide, lithium chloride and lithium nitrate. In contrast, in the cycle operation of the lithium bromide-water solution described previously in conjunction with FIG. 2b, this absorbent solution assumes point C (a concentration of 63.5 weight percent) in the absorber and is partially superimposed on crystallization line X—X'. This makes it impossible to continue the operation of the apparatus and to assure a concentration difference of more than 1 weight percent. However, if the absorbent solution of Example 3 is employed, a concentration difference of 2.5 weight percent can be assured and absorption refrigeration apparatus can operate in air-cooled conditions without any difficulties.

EXAMPLE 4

Figure 1D:
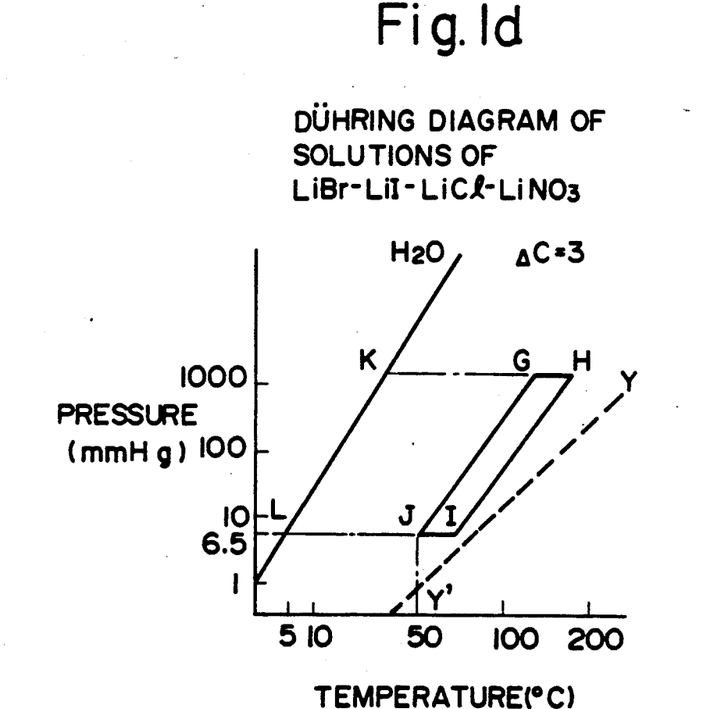

An aqueous solution of a mixture composed of lithium bromide, lithium iodide and lithium nitrate in a weight ratio of 1:0.63:0.25:0.25 was prepared as an absorbent solution. The aqueous solution was used with the absorption refrigeration apparatus described previously in conjunction with FIG. 6, and the cooling operation was performed. An operation cycle GHIJ of the aqueous solution of the mixture of lithium bromide, lithium iodide, lithium chloride and lithium nitrate was shown in the Dühring diagram of FIG. 1d. FIG. 1d is a Dühring diagram similar to FIG. 2b which shows the state of operating cycle, and graphically illustrates the relationship between temperature and vapor pressure. The conditions under which the absorbent solution absorbs a vapor refrigerant (water vapor) were a vapor refrigerant temperature: 5° C., an absorbent solution temperature: 50° C., and the concentration difference (Δc) in the absorbent solution before and after the absorption of the vapor refrigerant: 3 weight percent. The operation was similar to that employing the lithium bromide-water solution described previously.

In the high temperature generator 2, a low-concentration absorbent solution (63.4 weight percent) is heated from point G to point H, and the low-concentration absorbent solution is converted into a high-concentration absorbent solution (66.4 weight percent) as the result of the evaporation water from the low-concentration absorbent solution. Then, the high-concentration absorbent solution is cooled to point I in the absorber 13 in which it absorbs water vapor (point L, a temperature of 5° C. and a vapor pressure of 6.5 mmHg) and is thereby diluted to form a 50° C. low-concentration absorbent solution (63.4 weight percent) indicated at point J. Further, the low-concentration absorbent solution is heated from point J to point K, and is then recycled. During this time, water flowing in the cool-water pipe 15 is cooled by a low-temperature vapor refrigerant in the evaporator 16, and the thus-cooled water are used for cooling purposes.

The temperature of the four-component mixture absorbent solution used in Example 4 described above is not superimposed on crystallization line Y—Y' as represented by points I and J. Therefore, the absorption temperature of the absorbent solution of Example 4 is higher than the crystallization temperature of the same, and the absorbent solution assumes a complete solution state without involving the precipitation of either lithium halide or lithium nitrate. In contrast, in the cycle operation of the lithium bromide-water solution described previously in conjunction with FIG. 2b, this absorbent solution assumes point C (a concentration of 63.5 weight percent) in the absorber and is partially superimposed on crystallization line X—X'. This makes it impossible to continue the operation of the apparatus and to assure a concentration difference of more than 1 weight percent. However, if the absorbent solution of Example 3 is employed, a concentration difference of 3 weight percent can be assured under equal conditions and absorption refrigeration apparatus can operate in air-cooled conditions without any difficulties.

As described hereinabove, the absorbent solutions for absorption refrigeration apparatus in accordance with the present invention are comprised of aqueous solutions of mixtures composed of at least three components selected from the group consisting of lithium bromide, lithium iodide, lithium chloride and lithium nitrate. Therefore, the absorption temperatures of the absorbent solutions are higher than the crystallization temperatures of the same, and neither lithium halide nor lithium nitrate is precipitated in the absorbent solutions during the operation cycle of refrigeration apparatus. Therefore, air-cooled absorption refrigeration apparatus which have heretofore been difficult to realize can be operated with high safety and without any difficulties so that cool water is efficiently produced and utilized for cooling or refrigeration purposes. In addition, the absorbent solutions according to the present invention do not corrode the apparatus body, nor are precipitated even during a long period of use, and excel in heat resistance and durability.

What is claimed is:

1. An absorbent solution for use with an absorption refrigeration apparatus including a generator, a condenser, an evaporator and an absorber, comprising water as a refrigerant and an absorbent, said absorbent being a mixture of lithium iodide and at least two other lithium compounds selected from the group consisting of lithium bromide, lithium chloride, and lithium nitrate.

2. An absorbent solution for use with an absorption refrigeration apparatus according to claim 1, wherein said absorbent is a mixture of lithium bromide, lithium iodide and lithium chloride.

3. An absorbent solution for use with an absorption refrigeration apparatus according to claim 2, wherein the weight ratio of lithium bromide to lithium iodide to lithium chloride in said absorbent is 1:0.1–1.0:0.05–0.50.

4. An absorbent solution for use with an absorption refrigeration apparatus according to claim 1, wherein said absorbent is a mixture of lithium bromide, lithium iodide and lithium nitrate.

5. An absorbent solution for use with an absorption refrigeration apparatus according to claim 4, wherein the weight ratio of lithium bromide to lithium iodide to lithium nitrate in said absorbent is 1:0.1–1.0:0.05–0.50.

6. An absorbent solution for use with an absorption refrigeration apparatus according to claim 1, including a generator, a condenser, an evaporator and an absorber, comprising water as a refrigerant and an absorbent, wherein said absorbent being is a mixture of lithium bromide, lithium chloride and lithium nitrate, the weight rate of lithium bromide to lithium chloride to lithium nitrate in said absorbent is 1:0:0.1–1.0:0.05–0.50.

7. An absorbent solution of claim 6 wherein the weight ratio of lithium bromide to lithium chloride to lithium nitrate is 1:0.2–0.3:0.1–0.3.

8. An absorbent solution of claim 3 wherein the weight ratio of lithium bromide to lithium iodide to lithium chloride is 1:02–0.5:0.15–0.23.

9. An absorbent solution of claim 5 wherein the weight ratio of lithuim bromide to lithium iodide to lithium nitrate is 1:0.4–0.5:0.1–0.3.

10. An absorbent solution for use with an absorption refrigeration apparatus including a generator, a condenser, an evaporator including a generator, a condenser, an evaporator and an absorber, comprising water as a refrigerant and an absorbent, said absorbent being a mixture of lithium bromide, lithium iodide, lithium chloride and lithium nitrate.

11. An absorbent solution for use with an absorption refrigeration apparatus according to claim 10 wherein the weight ratio of lithium bromide to lithium iodide to lithium chloride to lithium nitrate in said solution is 1:0.1–1:0.05–0.5:0.05–0.5.

12. An absorbent solution of claim 11 wherein the weight ratio of lithium bromide to lithium chloride to lithium nitrate in said solution is 1:0.1–1:0.05–0.50:0.05–0.5.

13. An absorbent solution for use with an absorption refrigeration apparatus according to claim 12, wherein the weight ratio of lithium bromide to lithium iodide to lithium chloride to lithium nitrate in said absorbent is 1.0:0.5:0.1:0.1.

* * * * *